UNITED STATES PATENT OFFICE.

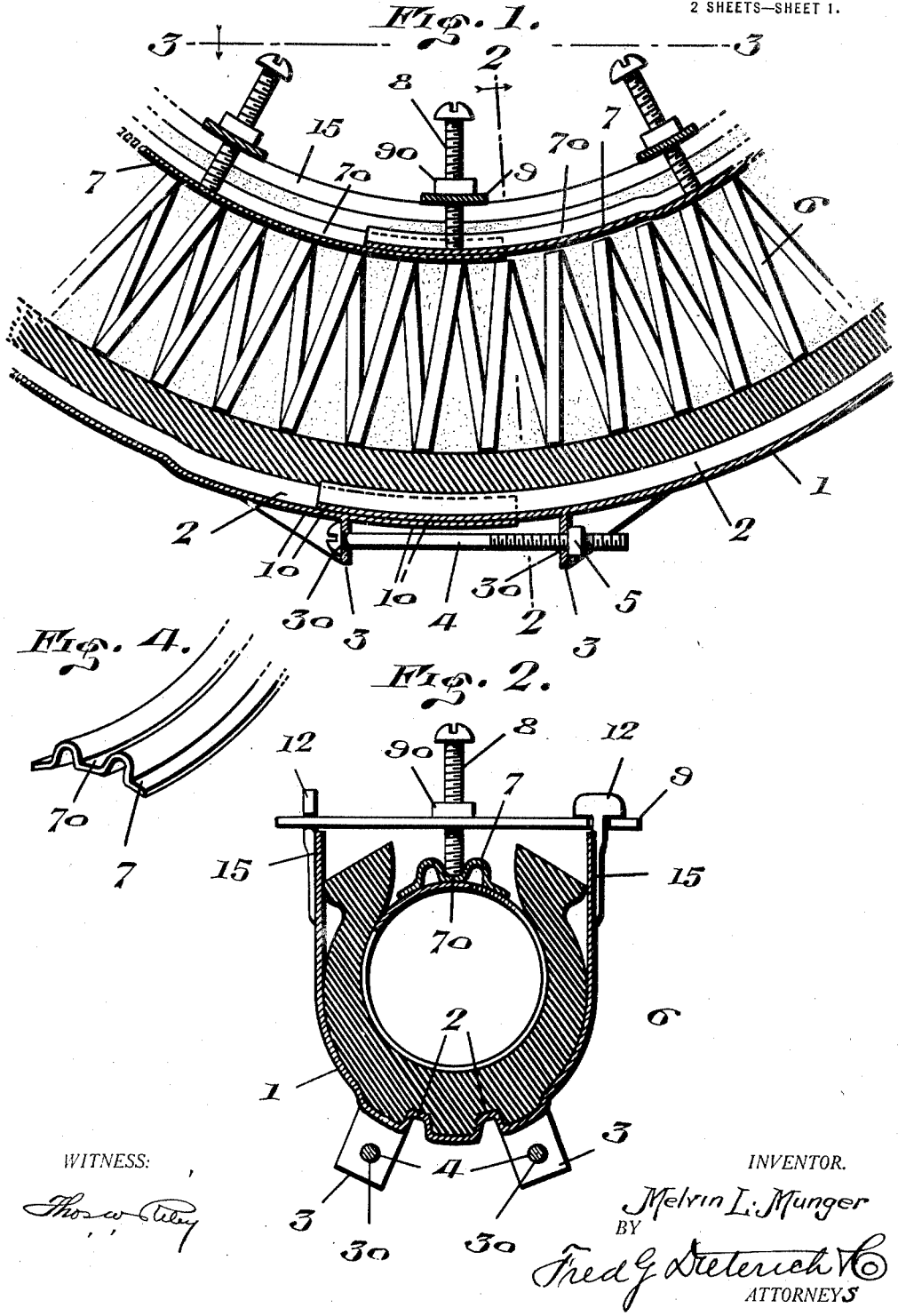

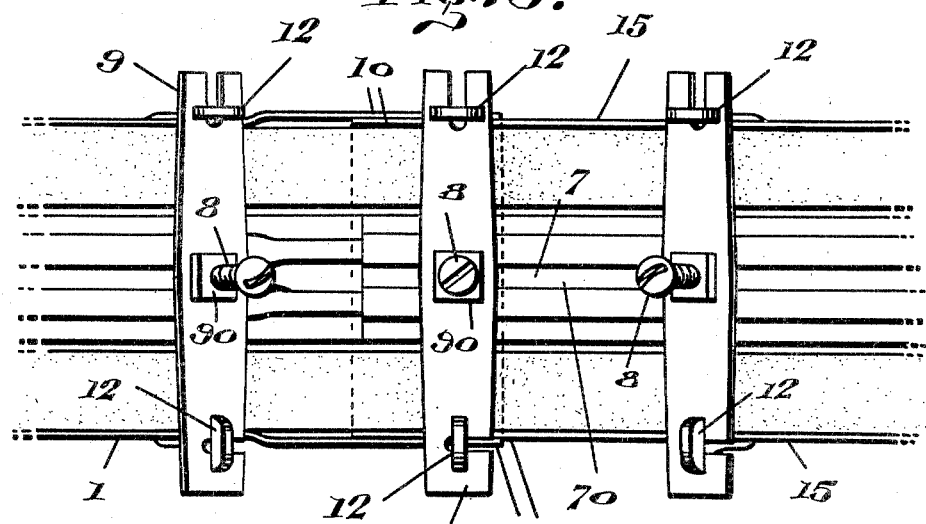
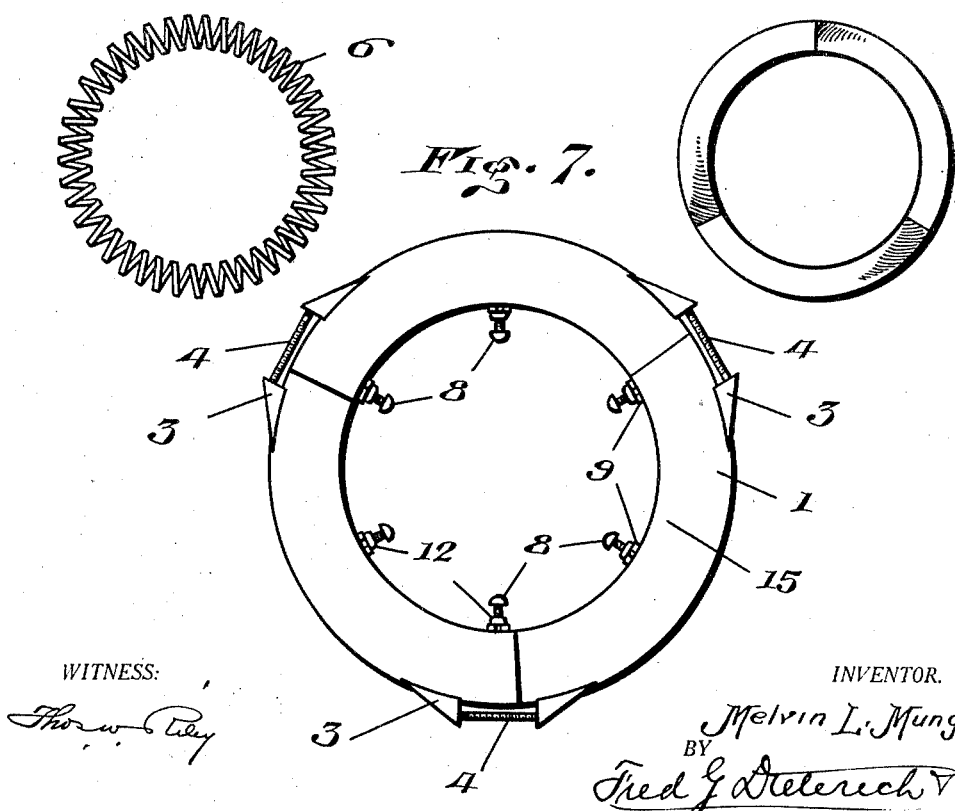

MELVIN L. MUNGER, OF LINCOLN, NEBRASKA.

TIRE-VULCANIZING MOLD.

1,334,629.  Specification of Letters Patent.  Patented Mar. 23, 1920.

Application filed September 22, 1919. Serial No. 325,405.

*To all whom it may concern:*

Be it known that I, MELVIN L. MUNGER, a citizen of the United States, at present residing at Lincoln, in the county of Lancaster and State of Nebraska, have invented a new and Improved Tire-Vulcanizing Mold, of which the following is a specification.

My present invention has reference to an improved construction of mold or container, in which the tire to be vulcanized is held to the desired shape or condition required as it is supported within the vulcanizing apparatus.

My invention comprehends a mold or container for tires, during the process of vulcanizing, of a simple and inexpensive construction in which the coöperative parts are designed for being readily adjusted to suit the different sizes of tires to be operated on and in which is included an improved means for holding the tire to its proper shape and under such internal resilient pressure, whereby to cause it to positively seat and fit within the shell of the mold or container, during vulcanization.

Again, my invention comprehends an improved construction of tire mold or container, which may consist of one or more pieces in which the walls of the opposing telescopic members are adapted for collapsible engagement for nesting and for being drawn up under sufficient compression for holding the tire to the desired bent form and for engaging the matrix or rib-like seats formed in the mold as the tire is held under expansion, by the resilient pressure internally thereof.

With other objects in view that will hereinafter be mentioned, my invention embodies, in a tire mold or container of the character stated, certain features of construction and novel combination of parts, all of which will be stated in the following detailed description, specifically pointed out in the appended claims and illustrated in the accompanying drawings, in which:

Figure 1 is a longitudinal section of a portion of my improved mold or container, parts being in side elevation, the several portions thereof being assembled for holding a tire in condition for vulcanizing.

Fig. 2 is a transverse section thereof taken substantially on the line 2—2 on Fig. 1.

Fig. 3 is a horizontal plan section thereof taken on the line 3—3 on Fig. 1.

Fig. 4 is a detail perspective view of a portion of the presser rim or shoe that engages the resilient filler for the tire and hereinafter specifically referred to.

Fig. 5 is a detail side view of the resilient filler, the same being shown in the nature of a coil spring.

Fig. 6 is a similar view of a filler portion composed of a pliable sand filled container.

Fig. 7 is a diagrammatic side view of a container mold constructed in accordance with my invention and composed of a plurality of sections.

In the practical application of my invention and in the preferred form thereof, the main or body portion 1 of the mold is of one piece and of substantial U shape in cross section and the said body is made up of sheet metal and bent to a circular form, the metal being of sufficient resiliency to cause the meeting ends 10—10 to normally close toward each other and to provide for the desired telescopic connection of the said ends, when drawing the mold or container members tightly around the tire, in the manner presently explained, the said meeting ends 10—10 are flared so that one will readily slip within the other, as is clearly indicated on Fig. 3.

Instead of making the mold of a single member, with devices at the meeting ends for drawing the said ends together, when fitting the mold around a tire to be held therein, the said mold may consist of a number of sections, as diagrammatically shown in Fig. 7, it being understood that, when the mold is of two or more sections, drawing up devices are located at the meeting ends of each of the different sections.

The inner surface of the mold, with which the tread face of the rubber tire is held in engagement, when the parts are assembled, is formed with ribs 2—2 and they are arranged to permit of telescopically connecting the free ends of the mold so as to nest and permit of the desired contraction or expansion adjustments of the mold, the said ribs serving to make the desired impressions on the tread surface of the tire, when the tire is held down against the bottom of the mold under internal spring pressure applied thereto in the manner presently explained.

At the meeting ends of the mold or container casing, means are provided for drawing the said ends telescopically together, one of such drawing up means being employed at each pair of meeting ends of the body, when the mold or casing is made of a plurality of sections, as before stated.

Referring now more particularly to Figs. 1 and 2, it will be observed that each of the meeting ends 10—10 has externally radially projected lugs 3—3 and each opposite pair of said lugs are joined by a drawing up or clamping bolt 4, the said bolts passing through apertures 30—30 in their respective engaging lugs and have their threaded ends adapted for engagement with clamping nuts 5; the tightening of which operates to draw the telescopic ends together and hold the mold around a rubber tire to be vulcanized.

To obtain the best desired result when subjecting the tire to the vulcanizing process, it is necessary that the rubber tire within the mold be positively held to its fully expanded condition with its tread face under positive pressure against the adjacent inner face of the mold.

For such purpose, I provide a filler for the rubber tire of a resilient body, which body may be a continuous spring coil 6 that extends around the full internal length of the tire, as indicated on Fig. 1.

For holding the said annular resilient filler for the tire under pressure against the base of the mold, an annular shoe 7 is held in engagement with the internal face of the said filler.

To hold the said shoe 7 under pressure against the resilient filler 6 and throughout its length and also allow for the required contraction and expansion of the meeting ends of the mold, I employ a clamping means such as is best shown in Figs. 2 and 3, a number of such clamping means being disposed around the internal circumference of the mold so that uniform pressure may be applied to the resilient filler throughout its length.

By referring now to Figs. 2 and 4, it will be noticed that the shoe 7 has an internal annular channel way or groove 70 into which the shoe engaging clamp bolts 8 project.

The bolts 8 engage threaded nut portions 90 on cross clamps 9, each of which has notches 91—91 for engaging T heads 12 that extend radially inwardly from the inner circumferential opposite edges 15—15 of the mold of which they form a fixed part, it being understood that, when the clamp bolts 8 are loosened, owing to the annular groove 70, the said clamp bolts retain their operative connection, relatively with the shoe 6, as the ends of the mold are expanded or drawn together.

Instead of using a coil spring that extends continuously around and within the tire, the same conditions, that is holding the tire under pressure against the seat or base of the mold is attained, by a filler consisting of an elongated bag of sand, as shown in Fig. 7, since the shoe and the means for clamping it against the tire filler will so adjust the sand filler that the tire rubber is held out under the desired pressure against the mold base.

While the detailed arrangement of the parts shown and described disclose a practical development of my invention, it is understood that modifications and variations of the details shown and explained may be readily made without departing from my invention as comes within the scope of the appended claims.

In my form of tire mold or container, the same may be readily and quickly adjusted to suit the particular diameter of tire to be vulcanized and the same, when the parts are assembled for use with the tire contained therein, may be readily and conveniently placed within the heated sand chamber of any of the modern types of vulcanizers, for example as shown in my patented vulcanizer dated July 29, 1919, No. 1,311,613.

From the foregoing description taken in connection with the drawings, the complete construction or manner of using and the advantages of my present invention will be readily apparent to those familiar with the art to which my said invention relates.

What I claim is:

1. In a tire mold of the character described, a circular casing having a cross sectional shape adapted to securely seat a tire, the said casing including opposing telescopic ends, means coöperative with the said ends for drawing them together, a resilient body for fitting into the tire being worked, and means for circumferentially expanding the said filling, whereby to maintain the tire closely seated within and against the mold.

2. In a tire mold of the character described, a circular casing having a cross sectional shape adapted to securely seat a tire, the said casing including opposing telescopic ends, means coöperative with the said ends for drawing them together, a resilient body for fitting into the tire being worked, and means for circumferentially expanding the said filling, whereby to maintain the tire closely seated within and against the mold, the said means including a shoe that engages the internal face of the filling and clamp screw devices on the casing that engages the said shoe.

3. In a tire mold of the character described, a circular casing having a cross sectional shape adapted to securely seat a tire, the said casing including opposing telescopic ends, means coöperative with the said ends for drawing them together, a resilient body for fitting into the tire being worked, and means for circumferentially expanding the said filling, whereby to maintain the tire closely seated within, and against the mold, the said means including annular shoe portions that engage the internal annular face of the filling, the internal annular face of the shoe having annular guideways, clamp plates adapted for being placed transversely across the open inner rim edges of the casing, the said rim edges and their plates having interlocking members, the said plates each having a screw bearing and clamp screws that engage the screw bearings and the annular guideway on the filler engaging shoe portions.

4. Means for holding a tire in condition for being vulcanized, the said means including a split circular shaped casing of suitable resilient metal, and substantially U-shape in cross section, the adjacent split ends being tapered, whereby to telescopically interengage, means at the said split ends for drawing the said ends together, the said means including drawing up screws, and screw brackets mounted on and externally of the mold, a filler of resilient material adapted for being inserted into and to be held within the tire to be vulcanized, means for expanding said filler, whereby to hold the tire seated against the casing, the said means including an annular shoe that engages the inner face of the resilient filler and clamp screws mounted on the casing and engaging the filler engaging shoe for the purposes specified.

MELVIN L. MUNGER.